US012582941B2

(12) United States Patent
Nakama et al.

(10) Patent No.: US 12,582,941 B2
(45) Date of Patent: Mar. 24, 2026

(54) GAS PRODUCTION APPARATUS, GAS PRODUCTION SYSTEM, STEEL PRODUCTION SYSTEM, CHEMICAL MANUFACTURING SYSTEM, AND GAS PRODUCTION METHOD WITH REDUCED CARBON DIOXIDE EMISSION

(71) Applicant: SEKISUI CHEMICAL CO., LTD., Osaka (JP)

(72) Inventors: Yuki Nakama, Ibaraki (JP); Rasika Dasanayake Aluthge, Ibaraki (JP); Masaki Nakamura, Ibaraki (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 1240 days.

(21) Appl. No.: 17/277,962

(22) PCT Filed: Aug. 4, 2020

(86) PCT No.: PCT/JP2020/029822
§ 371 (c)(1),
(2) Date: Mar. 19, 2021

(87) PCT Pub. No.: WO2022/029886
PCT Pub. Date: Feb. 10, 2022

(65) Prior Publication Data
US 2022/0305439 A1     Sep. 29, 2022

(51) Int. Cl.
*B01D 53/62* (2006.01)
*B01D 53/76* (2006.01)
(Continued)

(52) U.S. Cl.
CPC ............ *B01D 53/62* (2013.01); *B01D 53/76* (2013.01); *C10K 3/026* (2013.01); *C21B 5/06* (2013.01);
(Continued)

(58) Field of Classification Search
CPC ... C01B 32/40; F01N 3/2066; F01N 2570/10; C21B 2100/24; C21B 2100/282; C10K 3/026
See application file for complete search history.

(56) References Cited

U.S. PATENT DOCUMENTS

2007/0231242 A1* 10/2007 Wilson ................... C01B 32/40
                                                     423/418.2
2008/0159927 A1    7/2008 Smit et al.
(Continued)

FOREIGN PATENT DOCUMENTS

EP        1 888 224        2/2008
JP      2008-535654        9/2008
(Continued)

OTHER PUBLICATIONS

Machine Translation of WO-2012017916-A1 (Year: 2012).*
(Continued)

*Primary Examiner* — Imran Akram
(74) *Attorney, Agent, or Firm* — WENDEROTH, LIND & PONACK, L.L.P.

(57) ABSTRACT
A gas production apparatus includes: a separator configured to separate and capture a separated gas including carbon dioxide as a main component from an exhaust gas of exhaust gas equipment; reactors which are downstream of the separator, each of the reactors: (i) containing a reductant configured to contact the separated gas to produce carbon monoxide through a reduction reaction of carbon dioxide; (ii) being configured to separate at least some oxygen atoms split off from carbon dioxide in the reduction reaction; and (iii) having a reducing agent containing a metal oxide configured to reduce carbon dioxide as the reductant; a reducer configured to supply a reducing gas containing a reducing substance configured to reduce the reducing agent oxidized by contact with carbon dioxide; a pressure regu-
(Continued)

lator configured to regulate a pressure of the separated gas; and a flow regulator configured to regulate a flow rate of the separated gas.

13 Claims, 7 Drawing Sheets

(51) Int. Cl.
  *C10K 3/02*        (2006.01)
  *C21B 5/06*        (2006.01)
(52) U.S. Cl.
  CPC .... *B01D 2258/025* (2013.01); *C21B 2100/24* (2017.05); *C21B 2100/282* (2017.05); *C21B 2100/42* (2017.05)

(56)                References Cited

U.S. PATENT DOCUMENTS

| | | | |
|---|---|---|---|
| 2008/0164443 A1 | 7/2008 | White et al. | |
| 2013/0199937 A1* | 8/2013 | Cole | C25B 1/00 204/242 |
| 2013/0203142 A1* | 8/2013 | Young | C10G 2/32 252/373 |
| 2013/0229018 A1* | 9/2013 | Karni | F02C 3/20 60/39.12 |
| 2014/0005283 A1* | 1/2014 | Nakamura | B82Y 30/00 252/373 |
| 2014/0130639 A1* | 5/2014 | Baldauf | C21B 5/06 266/200 |
| 2016/0083810 A1* | 3/2016 | Kuhl | C21B 7/002 75/464 |
| 2016/0107893 A1* | 4/2016 | D'Souza | C01B 32/40 423/220 |
| 2017/0001862 A1* | 1/2017 | Manousiouthakis | C01B 3/36 |
| 2020/0017985 A1* | 1/2020 | Yamagiwa | C01B 32/40 |
| 2020/0139351 A1 | 5/2020 | Kuhn et al. | |
| 2021/0114004 A1 | 4/2021 | Dasanayake Aluthge et al. | |

FOREIGN PATENT DOCUMENTS

| | | | | |
|---|---|---|---|---|
| JP | 2012-36029 | 2/2012 | | |
| KR | 10-2020-0055939 | 5/2020 | | |
| WO | 2011/136045 | 11/2011 | | |
| WO | 2012/017916 | 2/2012 | | |
| WO | WO-2012017916 A1 * | 2/2012 | | C01B 31/18 |
| WO | 2019/163968 | 8/2019 | | |
| WO | 2019/230853 | 12/2019 | | |

OTHER PUBLICATIONS

Extended European Search Report issued Sep. 21, 2022 in corresponding European Patent Application No. 20922474.0.

International Search Report issued Nov. 2, 2020 in International (PCT) Patent Application No. PCT/JP2020/029822, with English language translation.

Marcus Wenzel et al., "CO production from CO2 via reverse water-gas shift reaction performed in a chemical looping mode: Kinetics on modified iron oxide", Journal of CO2 Utilization, vol. 17, pp. 60-68, Nov. 2017.

First Notice of Reasons for Refusal issued Mar. 18, 2024, in corresponding Chinese Patent Application No. 202080018678.6, with English translation.

Communication Pursuant to Article 94(3) EPC issued Nov. 14, 2023 in corresponding European Patent Application No. 20922474.0.

Office Action issued Nov. 12, 2024 in Chinese Patent Application No. 202080018678.6, with English translation.

Third Notice of Examination Opinion dated Apr. 8, 2025 in Chinese Patent Application No. 202080018678.6, with English translation.

\* cited by examiner

FIG.4

GAS PRODUCTION APPARATUS, GAS PRODUCTION SYSTEM, STEEL PRODUCTION SYSTEM, CHEMICAL MANUFACTURING SYSTEM, AND GAS PRODUCTION METHOD WITH REDUCED CARBON DIOXIDE EMISSION

TECHNICAL FIELD

The present invention relates to gas production apparatus, gas production systems, steel production systems, chemical manufacturing systems, and gas production methods.

BACKGROUND ART

In recent years, the atmospheric concentration of carbon dioxide ($CO_2$), a kind of greenhouse gas, has increased. The increase in the concentration of carbon dioxide in the atmosphere increases global warming. Therefore, it is vital to capture carbon dioxide released into the atmosphere. Converting the collected carbon dioxide into valuable substances and reusing them would achieve a carbon-recycling society.

Global policies, such as the Kyoto Protocol to the United Nations Framework Convention on Climate Change, stipulate that state parties accomplish a reduction target in a commitment period by defining a reduction of carbon dioxide causing global warming for each developed country with reference to the year 1990.

The reduction targets the exhaust gas containing carbon dioxide generated from steelworks, refineries, or thermal power plants. Thus, these industries are making various technical improvements on carbon dioxide reduction to reach the reduction target. One example of such a technology is $CO_2$ capture and storage (CCS). However, this technology has the physical limitation of storage and is not a fundamental solution.

In addition, for example, WO 2019/163968 discloses a carbon dioxide reduction system that produces carbon monoxide from carbon dioxide.

This carbon dioxide reduction system is equipped with a combustion furnace that generates exhaust gas containing carbon dioxide, a carbon dioxide separator that separates carbon dioxide from the exhaust gas, and reduction equipment that reduces the separated carbon dioxide to carbon monoxide.

SUMMARY OF INVENTION

Technical Problem

However, the inventors' investigation indicates that the flow rate and pressure of the exhaust gas from the combustion furnace fluctuate considerably. This tendency is even more pronounced for the separated gas containing carbon dioxide, which is separated from the exhaust gas by the carbon dioxide separator. Stable carbon monoxide production is still an issue with the separated gas supplied to the reduction equipment in such a state.

Therefore, the object of the present invention is to provide a gas production apparatus, a gas production system, and a gas production method capable of stably producing a product gas having carbon monoxide as the main component from a separated gas having carbon dioxide as the main component, as well as a steel production system and a chemical manufacturing system using the produced gas.

Solution to Problem

The following invention achieves these objectives.

(1) The gas production apparatus of the present invention is a gas production apparatus that produces a product gas including carbon monoxide as a main component by using an exhaust gas taken from a line of exhaust gas equipment that is equipped with a furnace, a smokestack that releases exhaust gas containing carbon dioxide emitted from the furnace, and the line connecting the smokestack to the furnace, comprising:

a separation and capture section that separates and captures a separated gas including carbon dioxide as a main component from the exhaust gas, a reaction section including at least one reactor, which is connected to downstream of the separation and capture section, containing a reductant that contacts with the separated gas to produce carbon monoxide through the reduction reaction of carbon dioxide and is capable of separating at least some of the oxygen atoms split off from carbon dioxide in the reduction reaction system, a pressure regulating section connected to the downstream of the reaction section to regulate the pressure of the separated gas supplied to the reactor, and a flow regulating section connected to the upstream of the separation and capture section and regulating the flow rate of the separated gas supplied to the reactor.

(2) In the gas production apparatus of the present invention, it is preferred that concentration of carbon dioxide in the separated gas is 70% or more by volume of the total separated gas.

(3) In the gas production apparatus of the present invention, it is preferred that the pressure of the separated gas supplied to the reactor is 0 to 2 MPaG.

(4) In the gas production apparatus of the present invention, it is preferred that at least one reactor includes a plurality of reactors that have a reducing agent containing a metal oxide that reduces carbon dioxide as the reductant, and the apparatus further has a reducing gas supply section that supplies reducing gas containing a reducing substance that reduces the reducing agent oxidized by contact with carbon dioxide, each of the reactors is connected to the separation and capture section or the reducing gas supply section, or connected to both, and each reactor can switch between the separated gas and the reducing gas to be supplied to each of the reactors and/or capable of transferring the reducing agent between the reactors.

(5) The gas production system of the present invention comprises exhaust gas equipment including a furnace, a smokestack that releases exhaust gas containing carbon dioxide emitted from the furnace, and a line connecting the smokestack to the furnace, and the gas production apparatus of the present invention, wherein the separation and capture section of the gas production apparatus is connected on the line and is configured to extract the exhaust gas from the exhaust gas equipment.

(6) In the gas production system of the present invention, it is preferred that the exhaust gas equipment is further equipped with a treater arranged on the line and treats the exhaust gas, wherein the exhaust gas is taken from the line between the smokestack and the treater.

(7) In the gas production system of the present invention, it is preferred that the treater includes at least one of a fan, a combustion furnace, a denitrator, or a desulfurizer.

(8) The steel production system of the present invention comprises the gas production apparatus of the present invention and a melting furnace connected to the downstream of the reaction section of the gas production apparatus, wherein the separated gas supplied to the reactor is brought into contact with the reductant to convert the carbon dioxide into carbon monoxide as the product gas, wherein the product gas containing carbon monoxide is supplied to the melting furnace. The carbon monoxide, thus generated, is used for the steel production of the present invention.

(9) In the steel production system of the present invention, it is preferred that the concentration of the carbon monoxide contained in the product gas is 70% or more by volume with respect to the total product gas.

(10) In the steel production system of the present invention, it is preferable to comprise a product gas heating section that heats the product gas before supplying it to the melting furnace.

(11) In the steel production system of the present invention, it is preferred that the temperature of the product gas after heating by the product gas heating section is 500-1300° C.

(12) The chemical manufacturing system of the present invention includes the gas production apparatus of the present invention and a second reaction facility connected to the downstream of the reaction section of the gas production apparatus, wherein the separated gas supplied to the reactor is brought into contact with the reductant to convert carbon dioxide into carbon monoxide as the product gas, wherein the product gas containing carbon monoxide is supplied to the second reaction facility to produce chemicals.

(13) The gas production method of the present invention is a gas production method for producing a product gas including carbon monoxide as a main component using the exhaust gas taken from a line of the exhaust gas equipment that is equipped with a furnace, a smokestack for releasing exhaust gas containing carbon dioxide emitted from the furnace, and the line connecting the smokestack to the furnace, comprising:

preparing at least one reactor that has a reductant that produces carbon monoxide through the reduction reaction of carbon dioxide, and can separate at least some of the oxygen atoms split off from carbon dioxide in the system of the reduction reaction, separating and capturing a separated gas containing carbon dioxide as a main component from the exhaust gas in the separation and capture section, controlling the pressure of the separated gas supplied to the reactor on the downstream of the reactor, while controlling the flow rate of the separated gas supplied to the reactor on the upstream of the separation and capture section, when the product gas is produced by supplying the separated gas to the reactor, and bringing the separated gas into contact with the reductant to convert carbon dioxide into carbon monoxide.

Advantageous Effects of Invention

The present invention enables stable production of product gas with carbon monoxide as the main component from separated gas including carbon dioxide as the main component. Using such product gas allows efficient steel production and chemical manufacturing.

BRIEF DESCRIPTION OF THE DRAWINGS

FIG. 4 is a schematic cross-sectional view of the configuration of the reactor in FIG. 3 (first configuration example).

DESCRIPTION OF EMBODIMENTS

The gas production apparatus, gas production system, steel production system, chemical manufacturing system, and gas production method of the present invention will be described in detail below based on the preferred embodiment shown in the accompanying drawings.

Overall Configuration

Figure 1:
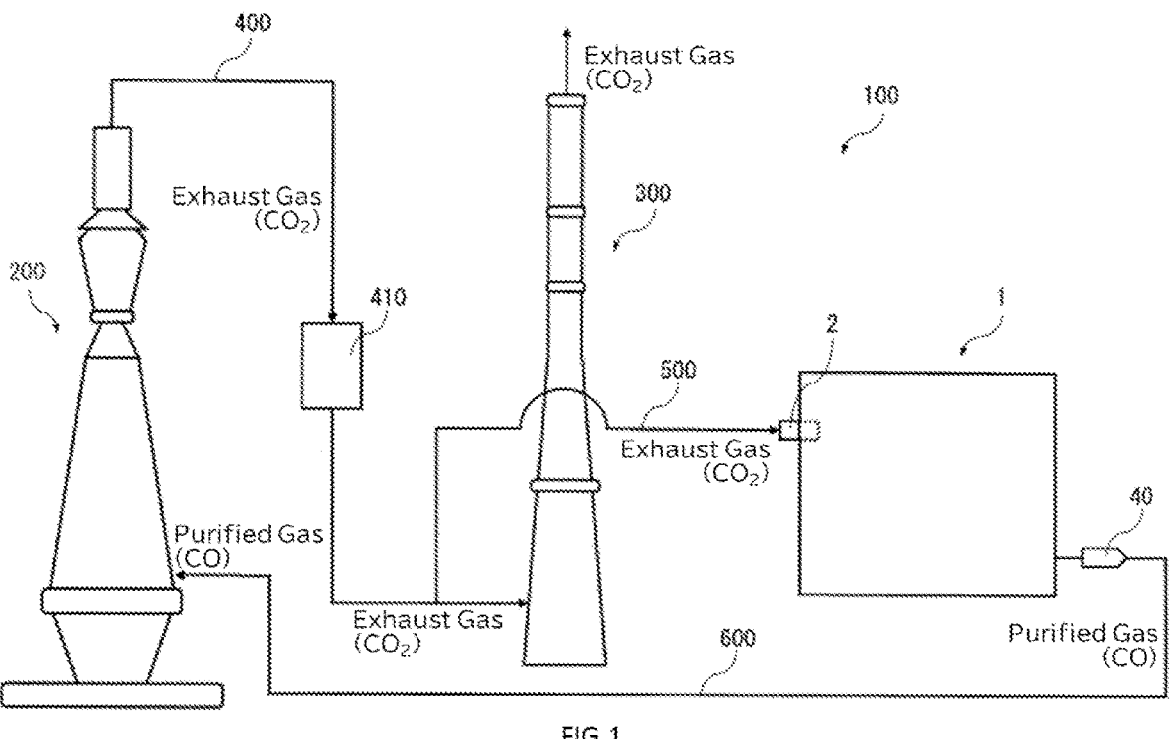
FIG. 1 is a schematic view of an embodiment of the steel production system of the present invention.
Figure 2:
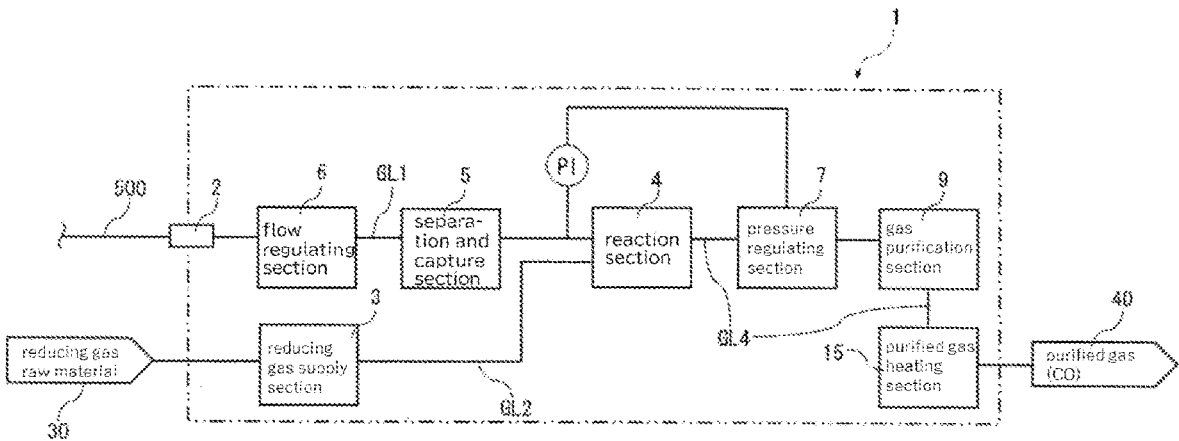
FIG. 2 is a schematic view of an embodiment of the gas production apparatus in the steel production system shown in FIG. 1.
Figure 3:
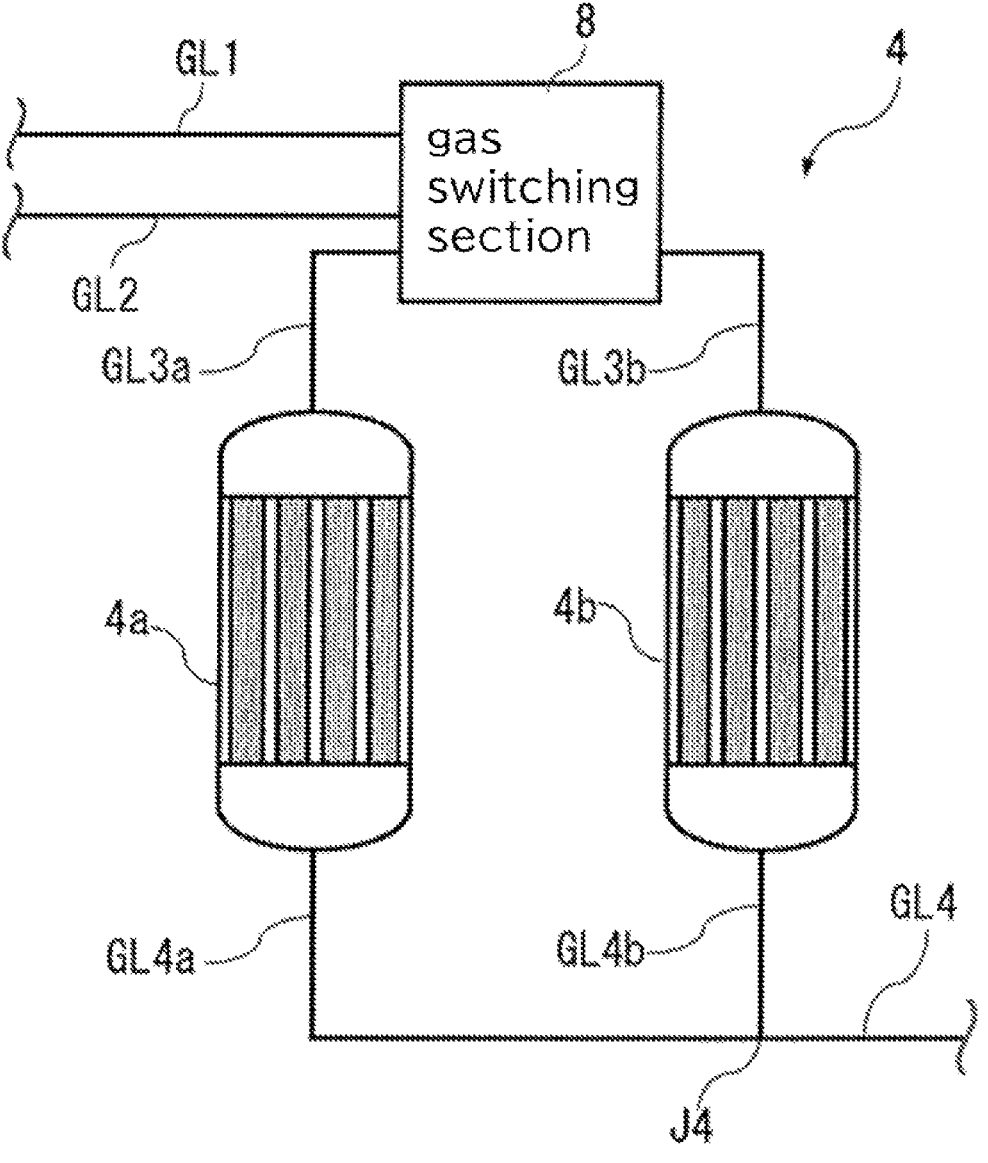
FIG. 3 shows the configuration of the reaction section in FIG. 2.
Figure 4:
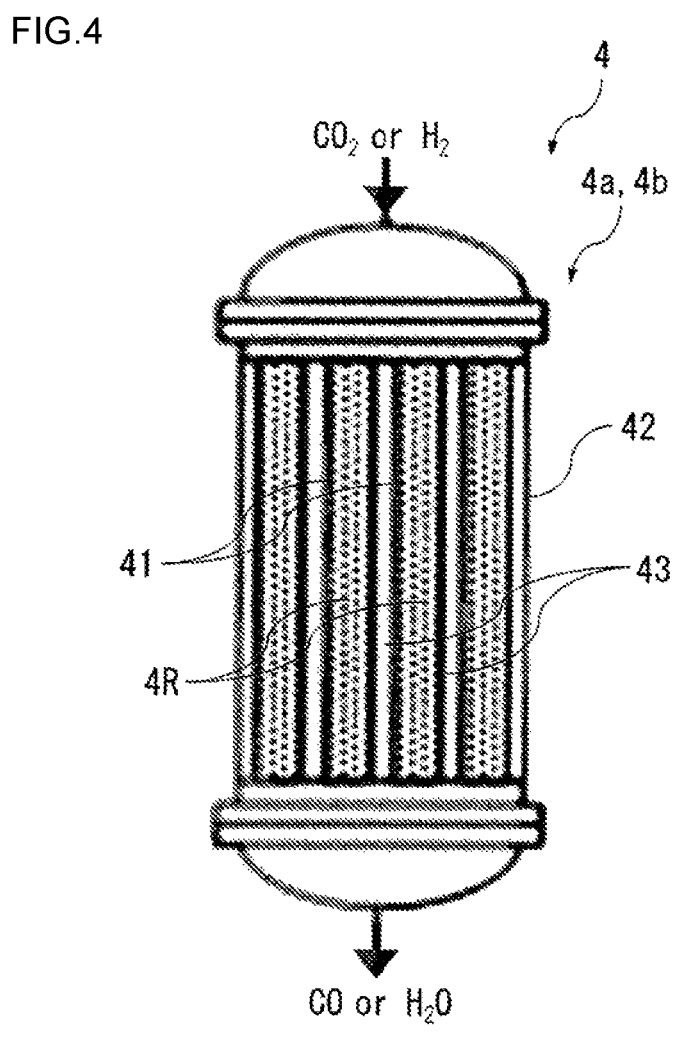

FIG. 1 is a schematic view of an embodiment of a steel production system, FIG. 2 is a schematic view of an embodiment of a gas production apparatus in the steel production system of FIG. 1, FIG. 3 is a configuration diagram of the reaction section of FIG. 2, and FIG. 4 is a cross-sectional view schematically showing the configuration of the reactor (first configuration example) of FIG. 3.

The steel production system (gas production system) 100 shown in FIG. 1 includes a blast furnace (melting furnace) 200, a smokestack 300, exhaust gas equipment having a gas line 400 connecting the blast furnace 200 and the smokestack 300, a supply line 500 branching off from the gas line 400, a gas production apparatus 1 connected to the supply line 500 via a connection section 2, and the return line 600 connecting the gas production apparatus 1 and the blast furnace 200.

In this description, the upstream with respect to the gas flow direction is referred to simply as the "upstream," and the downstream is also referred to simply as the "downstream."

This configuration of the present embodiment uses the exhaust gas emitted from the blast furnace 200, but it could be any other furnace attached to a steelworks or a refinery, for example. Other preferred furnaces include converters. In each furnace, exhaust gas is produced (generated) during the melting and refining of the contents. In addition to carbon dioxide, exhaust gas usually contains other gas components such as nitrogen, oxygen, carbon monoxide, steam, and methane.

The exhaust gas from the blast furnace (blast furnace gas) is a gas generated during the production of pig iron in the blast furnace and contains 10-15% by volume of carbon dioxide, 55-60% by volume of nitrogen, 25-30% by volume of carbon monoxide, and 1-5% by volume of hydrogen.

The exhaust gas from the converter (converter gas) is the gas generated during steel production in the converter and contains 15-20% by volume of carbon dioxide, 50-60% by volume of carbon monoxide, 15-25% by volume of nitrogen, and 1-5% by volume of hydrogen.

Using these exhaust gases enables the effective use of carbon dioxide, which was previously released into the atmosphere, thus reducing the load on the environment.

A treater 410 is arranged on the gas line 400 to treat the exhaust gas.

In this description, the gas before treatment in treater 410 and the gas after treatment in treater 410 are referred to as exhaust gas.

The treater 410 can comprise a fan, a combustion furnace (combustion boiler), a denitrator, and a desulfurizer, alone or in a combination of two or more of them. Arranging such a treater 410 enables the application of the desired treatment to the exhaust gas.

Installing a fan increases the exhaust gas supplied to the smokestack 300 or the exhaust gas pressure.

Installing a combustion furnace can burn off carbon monoxide in the exhaust gas and increase the concentration of carbon dioxide in the exhaust gas. Burning blast furnace gas in a combustion furnace makes the exhaust gas containing, for example, 5-15% by volume of carbon dioxide, 60-70% by volume of nitrogen, 5-10% by volume of oxygen, and 15-25% by volume of steam.

Installing a denitrator or desulfurizer can remove the nitrogen or sulfur components in the exhaust gas.

The gas line 400 is connected to the smokestack 300, which releases the exhaust gas.

On the gas line 400, between the treater 410 and the smokestack 300, a supply line 500 is connected (branched) to the gas line 400. In other words, gas production apparatus 1 uses the exhaust gas taken out from the gas line 400 of the exhaust gas equipment (between the treater 410 and the smokestack 300).

The piping that configures the gas line 400 is usually disposed (extended) along the horizontal direction (ground). In this case, the piping comprising the supply line 500 should be disposed (extended) almost orthogonally to the piping comprising the gas line 400 and along the vertical direction. This configuration can prevent the condensed water from mixing with the separated gas taken out to the supply line 500, even if the separated gas is cooled and condensed water is generated.

Gas Production Apparatus

The gas production apparatus 1 produces a product gas (synthesis gas) mainly composed of carbon monoxide by contacting exhaust gas supplied through the supply line 500 and the connection section 2 with a reducing agent containing a metal oxide that reduces carbon dioxide. As shown in FIG. 2, the gas production apparatus 1 mainly consists of a connection section 2, a reducing gas supply section 3, a reaction section 4, a gas line GL1 connecting the connection section 2 to the reaction section 4, a gas line GL2 connecting the reducing gas supply section 3 to the reaction section 4, and a gas line GL4 connected to the reaction section 4.

In this embodiment, connection section 2 constitutes the gas supply section that supplies the exhaust gas to the reaction section 4.

If necessary, a pump for transferring gas may be arranged at predetermined locations along the way of gas line GL1, gas line GL2, and gas line GL4. For example, suppose the pressure of the exhaust gas is relatively low. In that case, arranging a pump can smoothly transfer the gas within the gas production apparatus 1.

The gas line GL1 is connected to connection section 2 at one end.

On the other hand, as shown in FIG. 3, the gas line GL1 is connected at its other end to the inlet ports of the reactors 4a and 4b provided by the reaction section 4 via the gas switching section 8 and the two gas lines GL3a and GL3b, respectively.

This configuration makes the exhaust gas supplied through connection section 2 pass through the gas line GL1, supplying to the respective reactors 4a and 4b.

The gas switching section 8 can comprise, for example, a branched gas line and a channel opening/closing mechanism such as a valve installed on the branch gas line.

As shown in FIG. 4, each reactor 4a and 4b consists of a multitubular reactor (fixed-layer reactor) with a plurality of tubes 41 each filled with a reducing agent (reductant) 4R and a housing 42 containing the plurality of tubes 41. Such a multitubular reactor can ensure sufficient opportunities for contact between the reducing agent 4R and the separated gas (gas including carbon dioxide as a main component, separated and recovered from the exhaust gas in the separation and capture section 5 described below) and the reducing gas. This result can increase the production efficiency of the product gas.

The reducing agent 4R in this embodiment should be in the form of, e.g., particles (granules), scales, pellets, and the like. This shape of the reducing agent 4R can increase the filling efficiency of tube 41 and further increase the contact area with the gas supplied into tube 41.

If the reducing agent 4R is particulate shaped, its volume average particle diameter is preferably, but not limited to, from 1 to 50 mm, and more preferably from 3 to 30 mm. In this case, further increasing the contact area between the reducing agent 4R and the separated gas (carbon dioxide) can further improve the conversion efficiency of carbon dioxide to carbon monoxide. Similarly, the recovery (reduction) of the reducing agent 4R by the reducing gas containing the reducing substance can be performed more efficiently.

The particulate-shaped reducing agent 4R is preferably shaped articles produced by oscillating granulation to increase the sphericity.

The reducing agent 4R may be carried by a carrier. The carrier may be composed of a material that is not particularly limited as long as the material is not easily modified by the first gas (exhaust gas), reaction conditions, and the like, and examples of the material include carbon materials (graphite, graphene, and the like), zeolite, montmorillonite, $SiO_2$, $ZrO_2$, $TiO_2$, $V_2O_5$, MgO, alumina ($Al_2O_3$), silica, complex oxide of these materials, and the like. Among them, zeolite, montmorillonite, $SiO_2$, $ZrO_2$, $TiO_2$, $V_2O_5$, MgO, alumina ($Al_2O_3$), silica, and complex oxides of these materials are preferred. The carrier composed of such a material is preferred for not negatively affecting the reaction of the reducing agent 4R and having an excellent capability of carrying the reducing agent 4R. In this situation, the carrier does not participate in the reaction of the reducing agent 4R and simply supports (holds) the reducing agent 4R. Examples of such an embodiment include a configuration of coating at least part of the carrier surface with the reducing agent 4R.

The metal oxide (oxygen carrier) contained in the reducing agent 4R is not particularly limited as long as it is capable of reducing carbon dioxide. The metal oxide preferably contains at least one selected from metal elements belonging to the third through twelfth groups, more preferably contains at least one selected from metal elements belonging to the fourth through twelfth groups, even more preferably contains at least one of titanium, vanadium, iron, copper, zinc, nickel, manganese, chromium, cerium, and the like, and particularly preferably a metal oxide or complex oxide containing iron. These metal oxides are useful for having excellent conversion efficiency of carbon dioxide to carbon monoxide.

In each of the reactors 4a and 4b, the tubes (cylindrically shaped articles) 41 may be produced from the reducing agent 4R (metal oxide) itself. Moreover, shaped articles in a block form, a lattice form (e.g., mesh, honeycomb), and the like may be produced by the reducing agent 4R to be arranged in the housing 42. In these cases, the reducing agent 4R as a filler may be omitted or used in combination.

Among them, a configuration is preferred in which mesh structures are produced with the reducing agent 4R and arranged in housing 42. In such a configuration, it is also possible to sufficiently secure an opportunity to contact the reducing agent 4R with the separated gas and the reducing gas while preventing an increase in transmission resistance of the separated gas and the reducing gas in the respective reactors 4a and 4b.

Furthermore, the two reactors 4a and 4b are set to have a volume approximately equal to each other, which is appropriately set in accordance with the amount of the separated gas (exhaust gas) to be treated (the size of the furnace and the size of the gas production apparatus 1).

In order from the connection section 2 side at some points on the gas line GL1, a flow regulating section 6 and a separation and capture section 5 are provided.

The separation and capture section 5 separates and recovers the separated gas, mainly composed of carbon dioxide, from the exhaust gas. The exhaust gas also contains oxygen and other unwanted gas components. Separating the separated gas in the separation and capture section 5 can lower the concentration of unwanted gas components in the separated gas. It is thus possible to prevent or suppress negative influence by the unwanted gas components on the conversion efficiency of carbon dioxide to carbon monoxide by the reducing agent 4R.

The separation and capture section 5 can comprise, for example, a continuous separator of the membrane separation process, a separator of membrane separation pressure swing adsorption (PSA) process, and an amine absorption-type separator, an amine adsorption type separator, and the like. Among these, the separation and capture section 5 should consist of an amine absorption-type separator. Using an amine absorption-type separator can sufficiently increase the concentration of carbon dioxide in the separated gas to make it hard to produce byproducts when carbon dioxide is converted to carbon monoxide in the reaction section 4.

The concentration of carbon dioxide in the separated gas should be at least 70% by volume of the total separated gas, more preferably at least 80% by volume, even more preferably at least 90% by volume, and especially preferably at least 95% by volume. This arrangement will increase the efficiency of product gas production with carbon monoxide as the main component in gas production apparatus 1.

The upper limit of the concentration of carbon dioxide in the separated gas may be 100 volume percent, but in practical terms, it may be 99 volume percent or less, or 98 volume percent or less. In this case, the product gas can be produced without increasing the complexity of the configuration of the separation and capture section 5 or increasing the production cost of the equipment.

The flow regulating section 6 is connected (arranged) on the upstream of the separation and capture section 5.

The flow regulating section 6 regulates the flow rate of the separated gas supplied to reactors 4a and 4b. The flow regulating section 6 can increase, for example, a valve, a fan, a flow regulating valve, and an air volume regulator for the fan.

Regulating the valve opening degree can regulate the separated gas flow rate supplied to the reactors 4a and 4b.

On the other hand, for example, regulating the fan's rotational speed (so-called inverter control) can regulate the flow rate of the separated gas supplied to reactors 4a and 4b.

In addition, the flow regulating mechanism by the flow regulating section 6 should perform feedback control based on the indicated value of a separately provided flow meter (not shown). The installation position of the flow meter (FI) should be on the upstream (primary side) of the separation and capture section 5 when the throughput of separated gas processed is important. It should be on the upstream (primary side) of reactors 4a, and 4b when the amount of carbon dioxide supplied to the reactors 4a and 4b is important. It should be on the downstream (secondary side) of the reactors 4a and 4b when the amount of carbon monoxide production is important.

On the downstream from the separation and capture section 5 of the gas line GL1 (on the way to the reaction section 4), at least one of the following may be installed: a minor component removal section that removes minor components (such as minute amounts of unwanted gas components) from the separated gas, or a separated gas heating section that heats the separated gas before supplying it to the reactors 4a and 4b.

For example, the minor component removal section can be composed of at least one of the following types of treaters: a gas-liquid separator, guard reactor, or a scrubber (absorption column).

When multiple treaters are used, the order in which they are arranged is arbitrary, but when a gas-liquid separator is used in combination with a guard reactor, it is preferable to place the gas-liquid separator on the upstream from the guard reactor. In this case, the removal efficiency of minor components from the separated gas can be further improved, and the usable years (lifetime) of the guard reactor can be extended.

The gas-liquid separator, for example, separates the condensed water (liquid) generated in the separated gas from the separated gas. In this case, unwanted gas components, and the like, remaining in the separated gas are also dissolved and removed in the condensed water.

For example, the gas-liquid separator can comprise just a container, a swirl flow separator, a centrifugal separator, or a surface tension separator. Among these, it is preferable to use a simple container for the gas-liquid separator because of its simple configuration and low cost. In this case, a filter may be arranged at the gas-liquid interface in the container to allow gas passage but prevent liquid passage. In this case, a liquid line can be connected to the bottom of the container, and a valve can be installed on the line.

In such a configuration, opening the valve can emit the condensed water stored in the container outside the gas production apparatus 1 via the liquid line.

The liquid line may be connected to tank 30 described below to reuse the condensed water to be emitted.

The separated gas from which condensed water has been removed in the gas-liquid separator can be configured to be supplied to a guard reactor, for example.

Such a guard reactor should be equipped with a substance that can capture minor components in the separated gas, inactivating the reducing agent 4R upon contact with the reducing agent 4R (inactivation components).

In such a configuration, when the separated gas passes through the guard reactor, the substance in the guard reactor reacting (traps) with the inactivation component can prevent or suppress it from reaching the reducing agent 4R in reactors 4a and 4b, thereby protecting it (i.e., preventing it from losing its activity). This configuration can prevent or suppress the negative influence of inactivated components from significantly decreasing the conversion efficiency of carbon dioxide to carbon monoxide by the reducing agent 4R.

Such substances can include substances with a composition included in the reducing agent 4R, which inactivates the reducing agent 4R upon contact with inactive components, specifically, metal oxides that are the same as or similar to the metal oxides included in the reducing agent 4R. In this context, the similar metal oxide means metal oxide having the same metal element contained therein but having different composition or metal oxide having a metal element contained therein of a different kind but belonging to the same group in the periodic table of elements.

Such an inactivation component is preferably at least one selected from sulfur, mercury, sulfur compounds, halogen compounds, organic silicone, organic phosphorus, and organic metal compounds, and more preferably at least one selected from sulfur and sulfur compounds. Removal of such an inactivation component in advance allows preventing rapid reduction in the activity of the reducing agent 4R.

Furthermore, the above substance may be a substance to reduce its activity by the same component as the inactivation component of the reducing agent 4R and is preferably metal oxide, such as iron oxide and zinc oxide, for the excellent capability of capturing the inactivation component.

The guard reactor may have a configuration of arranging a mesh element in housing to place particles of the above substance on the mesh element, a configuration of arranging a honeycomb filter member composed of the substance or a cylindrical or particulate shaped article in the housing, and the like.

In particular, arranging the guard reactor between the separation and capture section 5 (gas-liquid separator) and the separated gas heating section allows improvement of the removal efficiency of the inactivation component while preventing degradation due to the heat of the substance.

Pre-heating the separated gas before reaction (before reduction) in the separated gas heating section enables the reducing agent 4R in reactors 4a and 4b to further accelerate carbon dioxide's conversion (reduction) reaction to carbon monoxide.

For example, the separated gas heating section can be composed of an electric heater and a heat exchanger (economizer).

The heat exchanger is constructed by bending some of the piping that makes up the gas line GL4, which discharges the gas (mixed gas) after passing through the reactors 4a and 4b, and bringing them closer to the piping that makes up the gas line GL1. Such a configuration enables effective use of heat since the heat of the high-temperature gas (mixed gas) after passing through the reactors 4a, and 4b is used to heat the separated gas before it is supplied to the reactors 4a and 4b by heat exchange.

Such heat exchangers can be configured as jacketed heat exchangers, immersed coil heat exchangers, double tube heat exchangers, shell and tube heat exchangers, plate heat exchangers, spiral heat exchangers, and the like.

The separated gas heating section may omit either the electric heater or the heat exchanger. The separated gas heating section can use a combustion furnace or similar device instead of an electric heater.

However, using electric heaters would allow using electric power (electrical energy) as a renewable energy source to power them, thus reducing the load on the environment.

Electrical energy as renewable energy is available from at least one of the following sources: solar power, wind power, hydroelectric power, wave power, tidal power, biomass power, geothermal power, solar heat, and geothermal heat.

On the upstream of the separated gas heating section (e.g., between the gas-liquid separator and the guard reactor, which is on the minor component removal section), the exhaust gas line can be branched off from the gas line GL1. A vent section outside the gas production apparatus 1 can be connected to the end of the line.

In this case, a valve is preferably installed on the exhaust gas line.

Suppose the pressure in the gas production apparatus 1 (gas line GL1) increases beyond the required level. In that case, opening the valve can discharge (release) a part of the separated gas from the vent section through the exhaust gas line. This operation prevents gas production apparatus 1 from being damaged due to an increase in pressure.

The gas line GL2 is connected to the reducing gas supply section 3 at one end. On the other hand, the gas line GL2 is connected to the inlet ports of the reactors 4a and 4b provided by the reaction section 4 via the gas switching section 8 and the two gas lines GL3a and GL3b, respectively.

The reducing gas supply section 3 supplies reducing gas containing a reducing substance that reduces the reducing agent 4R oxidized by contact with carbon dioxide. The reducing gas supply section 3 of this embodiment consists of a hydrogen generator that generates hydrogen by water electrolysis. A tank (reducing gas raw material storage section) 30 outside the gas production apparatus 1 that stores water is connected to this hydrogen generator. With such a configuration, the reducing gas containing hydrogen (reducing substance) supplied from the hydrogen generator (reducing gas supply section 3) passes through the gas line GL2 and is supplied to the respective reactors 4a and 4b.

The hydrogen generator can generate a large amount of hydrogen relatively at a low cost and with convenience. Another advantage is that the condensed water generated in gas production apparatus 1 can be reused. Since electrical energy consumption is significant in the hydrogen generation unit among the gas production apparatus 1, it is practical to use electric power as a renewable energy source as described above.

A byproduct hydrogen generator can also be used as a hydrogen generator. In this case, reducing gas containing byproduct hydrogen is supplied to each of the reactors 4a and 4b. Equipment that generates byproduct hydrogen includes, for example, equipment for electrolysis of sodium chloride solution, equipment for steam reforming of petroleum, and equipment for producing ammonia.

The gas line GL2 may be connected to the coke oven outside the gas production apparatus 1 via a connection section. The exhaust gas from the coke oven may be used as reducing gas. In this case, the connection section constitutes the reducing gas supply section. This is because the exhaust gas from the coke oven is mainly composed of hydrogen and methane, with hydrogen at 50-60% by volume.

A reducing gas heating section may be installed on the gas line GL2. This reducing gas heating section heats the reducing gas before supplying it to reactors 4a and 4b. Pre-heating the reducing gas before reaction (before oxidation) in the reducing gas heating section further accelerates the reduction (recovery) reaction of the reducing agent 4R by the reducing gas in reactors 4a and 4b.

The reducing gas heating section can be configured the same way as the separated gas heating section described above. The reducing gas heating section should preferably consist of an electric heater only, a heat exchanger only, or a combination of an electric heater and a heat exchanger. It should preferably consist of a heat exchanger only or a combination of an electric heater and a heat exchanger.

Equipping the reducing gas heating section with a heat exchanger can use the heat of the high-temperature gas (e.g., mixed gas) after passing through the reactors 4a and 4b to heat the reducing gas before it is supplied to the reactors 4a and 4b by heat exchange, thus making effective use of the heat.

In the configuration described above, switching the gas line (channel) in the gas switching section 8, for example, can supply the separated gas to the reactor 4a containing the reducing agent 4R before oxidation via the gas line GL3a, and supply the reducing gas to the reactor 4b containing the reducing agent 4R after oxidation via the gas line GL3b. In this case, the reaction of Equation 1 below proceeds in reactor 4a, and the reaction of Equation 2 below proceeds in reactor 4b.

In Equations 1 and 2 below, the case where the metal oxide contained in the reducing agent 4R is iron oxide ($FeO_{x-1}$) is shown as an example.

$$CO_2 + FeO_{x-1} \rightarrow CO + FeO_x \qquad \text{Equation 1:}$$

$$H_2 + FeO_x \rightarrow H_2O + FeO_{x-1} \qquad \text{Equation 2:}$$

Then, switching the gas line in the gas switching section 8 in the opposite direction to the above can proceed with the reaction of Equation 2 above in reactor 4a and the reaction of Equation 1 above in reactor 4b.

The reactions shown in Equations 1 and 2 above are both endothermic.
Therefore, the gas production apparatus 1 should have more reducing agent heating sections (not shown in FIG. 2) for heating the reducing agent 4R when the separated gas or reducing gas is brought into contact with the reducing agent 4R (i.e., when the separated gas or reducing gas reacts with the reducing agent 4R).

Installing such a reducing agent heating section can maintain the temperature in the reaction between the separated gas or reducing gas and the reducing agent 4R at a high temperature to suitably prevent or suppress the decrease in the conversion efficiency of carbon dioxide to carbon monoxide and further promote the recovery of the reducing agent 4R by the reducing gas.

However, depending on the reducing agent 4R, the reactions shown in Equations 1 and 2 above may be exothermic. In this case, gas production apparatus 1 should have a reducing agent cooling section that cools the reducing agent 4R instead of the reducing agent heating section. Providing such a reducing agent cooling section can suitably prevent the degradation of the reducing agent 4R during the reaction of the separated gas or reducing gas including the reducing agent 4R, suitably prevent or suppress the conversion efficiency of carbon dioxide to carbon monoxide, and further promote the recovery of the reducing agent 4R by the reducing gas.

In other words, the gas production apparatus 1 should be equipped with a reducing agent temperature regulation section that regulates the temperature of the reducing agent 4R depending on the kind of reducing agent 4R (exothermic or endothermic reaction).

The concentration of carbon monoxide in the generated product gas (gas that has passed through the reactors 4a and 4b) should be at least 70% by volume of the total product gas, preferably at least 80% by volume, and even more preferably at least 90% by volume. This enables obtaining purified gas including a sufficiently high concentration of carbon monoxide even if the configuration of the gas purification section 9, described below, is simplified.

The upper limit of the concentration of carbon monoxide in the product gas may be 100 volume percent. Realistically, it should be 95 volume percent or less. In this case, the product gas can be generated without increasing the complexity of the configuration of reactors 4a and 4b or increasing the production cost of reactors 4a and 4b.

Branched gas lines GL4a and GL4b are connected to the outlet ports of reactors 4a and 4b, respectively, and these merge at the gas joint section J4 to form gas line GL4.

In this embodiment, reaction section 4 comprises reactors 4a, 4b, and gas switching section 8.

With this configuration, the gases that have passed through each of the reactors 4a and 4b (in this embodiment, the product gas and steam, which are mainly composed of carbon monoxide) are mixed by merging at the gas joint section J4 to produce a mixed gas (confluence gas), which then passes through one gas line GL4.

Therefore, changing the channel switching state (opening and closing state of the valve) of the gas switching section 8 and performing different reactions in each of the reactors 4a and 4b can produce mixed gas continuously, and finally, produce purified gas continuously. Since the same reaction is repeated alternately in reactors 4a and 4b, the concentration of carbon monoxide in the mixed gas can be stabilized. As a result, the concentration of carbon monoxide in the purified gas can also be stabilized.

Therefore, the above-mentioned gas production apparatus 1 (steel production system 100) can continuously and stably produce carbon monoxide from carbon dioxide, which is industrially advantageous. In addition, it is possible to produce steel while efficiently reducing carbon dioxide emissions.

In contrast, no provision of the gas joint section J4 requires blocking the gas switching section 8 (close the valve once) when switching the gas to be supplied, forcing each reactor 4a and 4b to be the batch type. Therefore, the production time of carbon monoxide may take a long time, resulting in poor conversion efficiency and industrial disadvantages, depending on the concentration of carbon dioxide in the separated gas, the kind of reducing agent 4R, and the capacity of the reactors 4a and 4b.

The composition of the gas emitted from each reactor 4a and 4b tends to change every time the gas to be supplied is switched. This may complicate the after-treatment procedures of the gases emitted from each reactor 4a and 4b.

Here, the concentration of carbon monoxide in the mixed gas is usually preferably regulated to a specific range (a predetermined volume percentage of the total mixed gas). Too low a carbon monoxide concentration makes it difficult to obtain purified gas containing a high concentration of carbon monoxide, depending on the performance of the gas purification section 9 described below. On the other hand, increasing the concentration beyond the upper limit can produce no further increase in the concentration of carbon monoxide in the final purified gas.

The purified gas emission section 40, which emits the purified gas out of gas production apparatus 1, is connected to the opposite end of the reactors 4a and 4b of the gas line GL4. The purified gas emission section 40 is connected to the blast furnace 200 via a return line 600. With this configuration, purified gas is supplied to the blast furnace 200.

On the gas line GL4, a pressure regulating section 7, a gas purification section 9, and a purified gas heating section 15 are installed in this order from the upstream.

The pressure regulating section 7 is connected to the downstream of the reaction section 4 and regulates the pressure of the separated gas supplied to reactors 4a and 4b. The pressure of the separated gas supplied to reactors 4a and 4b is detected by a pressure gauge PI installed on the upstream of the reaction section 4.

Since the present invention regulates the pressure and flow rate of the separated gas supplied to the reactors 4a and 4b allows stabilization of the passage rate of the separated gas and the reducing gas through the reactors 4a and 4b (i.e., the treatment rate of the separated gas by the reducing agent 4R and the treatment rate of the reducing agent 4R by the reducing gas). As a result, it is possible to stably produce a product gas including carbon monoxide as its main component.

Such a pressure regulating section 7 can be composed of valves, pressure regulating valves, and the like.

The pressure of the separated gas supplied to the reactors 4a and 4b should be preferably 0 to 2 MPaG and, more preferably, 0.01 to 0.9 MPaG. In this case, coupling with regulating the flow rate of the separated gas supplied to the reactors 4a and 4b can further improve the above effect.

The gas purification section 9 purifies carbon monoxide from the mixed gas and captures the purified gas containing a high concentration of carbon monoxide. Sufficiently high carbon monoxide concentration in the mixed gas may allow omitting the gas purification section 9

For example, such a gas purification section 9 can consist of at least one of the following types of treaters: a condenser, a gas-liquid separator, a gas separator, a separation membrane, and a scrubber (absorption column).

When multiple treaters are used, the order in which they are arranged is arbitrary, but when the condenser, gas-liquid separator, and gas separator are used in combination, it is preferable to arrange them in this order. This case would further improve the purification efficiency of carbon monoxide from the mixed gas.

The condenser cools the mixed gas. This generates condensed water (liquid).

Such a condenser can consist of a jacket-type condenser with a jacket for passing coolant around the pipes, a configuration similar to reactors 4a and 4b (see FIG. 4), a multitubular cooling system with mixed gas and coolant passing inside and around the tubes, respectively, and an air-fin cooler.

The gas-liquid separator separates the condensed water produced when the condenser cools the mixed gas from the mixed gas. The condensed water has the advantage of dissolving and removing unwanted gas components (especially carbon dioxide) remaining in the mixed gas.

The gas-liquid separator can be constructed the same way as the gas-liquid separator in the minor component removal section. It can preferably consist of just a container. In this case, a filter may be arranged at the gas-liquid interface in the container to allow gas passage but prevent liquid passage.

In this case, a liquid line can be connected to the bottom of the container, and a valve can be installed on the line. In this configuration, opening the valve can emit (release) the condensed water stored in the container outside the gas production apparatus 1 via the liquid line.

In addition, a drain trap should be installed on the downstream from the valve on the liquid line. This means that even if the valve were to malfunction and carbon monoxide or hydrogen were to leak into the liquid line, it would be stored in the drain trap and prevented from being emitted outside the gas production apparatus 1. In place of this drain trap, or together with the drain trap, a malfunction detection function for the valve and redundancy system in case the valve malfunctions may be provided.

The liquid line may be connected to tank 30, described above so that the condensed water to be emitted can be reused.

The gas separator can be composed of one or more of the following types of separators: a low-temperature separation (deep cooling) separator, a pressure swing adsorption (PSA) separator, a membrane separation separator, a temperature swing adsorption (TSA) separator, a separator using a porous coordination polymer (PCP) complexed with a metal ion (e.g., copper ion) and an organic coordination ligand (e.g., 5-azidoisophthalic acid), a separator using amine absorption, and the like. A valve may be installed between the gas-liquid separator and the gas separator in the gas line GL4.

In this case, regulating the valve's opening degree can adjust the mixed gas's treatment rate (production rate of purified gas).

In this embodiment, the concentration of carbon monoxide in the mixed gas emitted from the gas-liquid separator is 75-100% by volume of the total mixed gas.

Then, when the purified gas is returned to the blast furnace (melting furnace) 200 to be used as a reducing agent, as in this embodiment, carbon monoxide is purified from the mixed gas to obtain purified gas containing carbon monoxide in high concentration.

In this embodiment, the purified gas is returned to the same blast furnace 200 from which the blast furnace gas was captured, but the purified gas may be returned to a different blast furnace 200 or an electric furnace (another melting furnace).

The gas joint section J4 may be omitted, and the branch gas lines GL4a and GL4b may be used as independent gas lines. In this case, the gas (water or product gas) after passing through each reactor 4a and 4b is transferred through branched gas lines GL4a and GL4b, which are independent of each other. For example, the gas containing water (steam) is provided for disposal or conversion treatment to tank 30. The product gas including carbon monoxide as a main component, is emitted to the return line 600 through the purified gas emission section 40 after passing through the gas purification section 9. Such a configuration allows treatment of the gases after passing through the respective reactors 4a and 4b independently from each other.

The purified gas heating section 15 heats the purified gas captured in the gas purification section 9 (when the gas joint section J4 is omitted, the product gas emitted from each reactor 4a and 4b or the product gas that has passed through the gas purification section 9). In other words, the purified gas (product gas) is heated before it is returned (supplied) to the blast furnace 200. As a result, blowing purified gas into the blast furnace 200 can lower the temperature during steel production, suitably preventing the steel production efficiency from decreasing and the content of impurities from increasing.

The purified gas heating section 15 can consist of, for example, an electric heater, a combustion furnace (combustion boiler), a heat exchanger using a high-temperature heat medium, and an economizer (heat reclaim device).

The purified gas (product gas) temperature after heating by the purified gas heating section 15 is preferably 500-1300° C., and more preferably 900-1200° C. This case can further enhance the above effect.

Next, the method for using (action) of the steel production system 100 will be explained.

[1] First, switching the gas line (channel) in the gas switching section 8 communicates the connection section 2 with reactor 4a and the reducing gas supply section 3 with reactor 4b.

[2] Next, in this state, start supplying exhaust gas containing carbon dioxide from the blast furnace 200 through the gas line 400, supply line 500, and connection section 2.

The exhaust gas supplied from the connection section 2 is usually at a high temperature of 50 to 300° C. but is cooled to 30 to 50° C. by the time it reaches the flow regulating section 6.

[3] Next, the exhaust gas passes through the flow regulating section 6.

This regulates the flow rate of the separated gas that passes through the separation and capture section 5 and is supplied to reactors 4a and 4b.

The flow rate of the separated gas should be 300 to 2000 $hr^{-1}$ as the space velocity, which is the amount of carbon dioxide per hour supplied to the reactors 4a and 4b divided by the filling capacity (volume) of the reducing agent 4R, and more preferably 1000 to 8000 hr'. Even increasing the flow rate of the separated gas beyond the upper limit expects no further increase in the conversion efficiency of carbon dioxide to carbon monoxide. On the other hand, if the flow rate of the separated gas is too low, the conversion efficiency of carbon dioxide to carbon monoxide may be insufficient, depending on the kind of reducing agent 4R and other factors.

[4] Next, the exhaust gas passes through the separation and capture section 5.

This process separates and captures the separated gas, which is mainly composed of carbon dioxide.

[5] Next, the separated gas is supplied to reactor 4a. In reactor 4a, reducing agent 4R reduces (converts) carbon dioxide in the separated gas to carbon monoxide, resulting in a product gas including carbon monoxide as its main component. This process oxidizes the reducing agent 4R.

The temperature of the separated gas supplied to the reactors 4a and 4b is preferably between 300 and 700° C., more preferably between 450 and 700° C., even more preferably between 600 and 700° C., and especially preferably between 650 and 700° C. Setting the temperature of the separated gas in the above range, for example, can proceed the reduction reaction of carbon dioxide in the reactor 4A more smoothly because it can prevent or suppress the rapid temperature drop of the reducing agent 4R due to endothermic reaction during the conversion of carbon dioxide to carbon monoxide.

[6] In parallel with the above processes [2] to [5], supplying water (raw material for reducing gas) from tank 30 to the hydrogen generator (reducing gas supply section 3) generates hydrogen from water.

[7] Next, the reducing gas is supplied to reactor 4b. In reactor 4b, the reducing gas (hydrogen) reduces (regenerates) the reducing agent 4R in the oxidized state.

The temperature of the reducing gas supplied to the reactors 4a and 4b is preferably 300-700° C., more preferably 450-700° C., even more preferably 600-700° C., and particularly preferably 650-700° C. Setting the temperature of the reducing gas in the above range, for example, can proceed with the reduction reaction of the reducing agent 4R in the reactor 4b more smoothly because it prevents or suppresses the rapid temperature drop of the reducing agent 4R due to endothermic reaction during the reduction (recovery) of the reducing agent 4R in the oxidized state.

When the temperature of the separated gas is X [° C.], and the temperature of the reducing gas is Y [° C.] at the time of supplying to the reactors 4a and 4b, the absolute value of the temperature difference |X−Y| of the separated gas is preferably between 0 and 25, and more preferably between 0 and 20, and even more preferably between 0 and 15. In other words, the temperature X of the separated gas and the temperature Y of the reducing gas may be the same or slightly different. Setting X and Y to satisfy the above relationship can proceed with the conversion of carbon dioxide to carbon monoxide and the reduction of the reducing agent 4R by the reducing gas in a good balance.

When the temperature X of the separated gas is different from the temperature Y of the reducing gas, it is preferable to set the temperature Y of the reducing gas higher than the temperature X of the separated gas because the heat quantity required for the reduction reaction of the reducing agent 4R by the reducing gas tends to be larger than the heat quantity required for the reduction reaction of carbon dioxide by the reducing agent 4R.

In this embodiment, the timing for switching the gas line in the gas switching section 8 (i.e., the timing for switching between the separated gas and the reducing gas supplied to the reactors 4a and 4b) is preferably condition I: when a predetermined amount of separated gas is supplied to the reactors 4a or 4b, or condition II: when the conversion efficiency of carbon dioxide to carbon monoxide falls below a predetermined value. This operation can increase and stabilize the concentration of carbon monoxide in the mixed gas because reactors 4a and 4b are switched before the conversion efficiency of carbon dioxide to carbon monoxide drops significantly.

For detecting condition II, gas concentration sensors can be arranged near the inlet and outlet ports of the reactors 4a and 4b, respectively. The detected value of the gas concentration sensor enables the calculation of the conversion efficiency of carbon dioxide to carbon monoxide.

From the viewpoint of stabilizing the concentration of carbon monoxide in the mixed gas, it is preferable to set the amount of separated gas supplied to reactors 4a and 4b to be as close as possible to the amount of reducing gas supplied to the reactors 4a and 4b. Specifically, when the amount of separated gas supplied to the reactors 4a and 4b is P [mL/min], and the amount of reducing gas supplied to the reactors 4a and 4b is Q [mL/min], P/Q is preferably in the range from 0.9 to 2, and more preferably in the range from 0.95 to 1.5. Too large a supplied amount of separated gas P would increase the amount of carbon dioxide emitted from reactors 4a and 4b without being converted to carbon monoxide, depending on the amount of reducing agent 4R in reactors 4a and 4b.

The predetermined amount in the condition I above should preferably be 0.01 to 3 moles of carbon dioxide per mole of the metal element with the highest mass ratio in the reducing agent 4R, and more preferably 0.1 to 2.5 moles.

The predetermined value in condition II above should be preferably 50-100%, more preferably 60-100%, and even more preferably 70-100%. The upper limit of the predetermined value may be 95% or less, or 90% or less.

In both cases, the reactors 4a and 4b can be switched before the conversion efficiency of carbon dioxide to carbon monoxide becomes extremely low, resulting in a stable mixed gas containing a high concentration of carbon monoxide, thus producing purified gas containing a high concentration of carbon monoxide.

The supplied amount of reducing gas (reducing substance) Q should be preferably in the range from 0.1 to 3 moles of hydrogen per mole of the metal element with the highest mass ratio in the reducing agent 4R, and more preferably in the range from 0.15 to 2.5 moles. Increasing the supplied amount of reducing gas Q even beyond the upper limit expects no further increase in the effect of reducing the reducing agent 4R in the oxidized state. On the other hand, too small a supplied amount of reducing gas Q could make the reduction of the reducing agent 4R insufficient, depending on the amount of hydrogen contained in the reducing gas.

The pressure of the reducing gas supplied to reactors 4a and 4b may be atmospheric pressure or pressurized (the same level as the separated gas).

[8] Next, the gases passing through reactors 4a and 4b are merged to produce a mixed gas. At this point, the temperature of the mixed gas is typically 600 to 650° C. The temperature of the mixed gas at this point in the above range means the temperature in reactors 4a and 4b is maintained to be sufficiently high. The conversion of carbon dioxide to carbon monoxide by the reducing agent 4R and the reduction of the reducing agent 4R by the reducing gas are judged to be proceeding efficiently.

[9] Next, the mixed gas is cooled down to 100-300° C. before reaching the Gas Purification Unit 9.

[10] Next, the mixed gas passes through the pressure regulating section 7.

The pressure regulating section 7 controls the pressure of the separated gas supplied to the reactors 4a and 4b by, for example, regulating the opening degree of the valve so that the detected value (indicated value) of the pressure gauge PI installed on the upstream of the reactors 4a and 4b is within the above range.

When the separated gas or reducing gas to be supplied to the reactors 4a and 4b is heated beforehand, the pressure gauge PI should be installed on the upstream (primary side) of the separated gas heating section or reducing gas heating section. In this case, a pressure gauge made of a material with low thermal resistance can be used as the pressure gauge PI, which is less expensive.

[11] Next, the mixed gas passes through the gas purification section 9. This step removes, for example, the produced condensed water and carbon dioxide dissolved in the condensed water. As a result, carbon monoxide is purified from the mixed gas, and a purified gas containing a high concentration of carbon monoxide is obtained.

The temperature of the resulting purified gas is 20 to 50° C.

[12] Next, the purified gas passes through the purified gas heating section 15. This step heats the purified gas. The temperature of the purified gas at this time is preferably 500 to 1300° C., as described above.

[13] Next, the purified gas returns to the blast furnace 200 via the purified gas emission section 40 and the return line 600.

In this way, the steel production system 100 enables steel production while efficiently reducing carbon dioxide emissions.

Configuration Near the Connection Section

Figure 5:
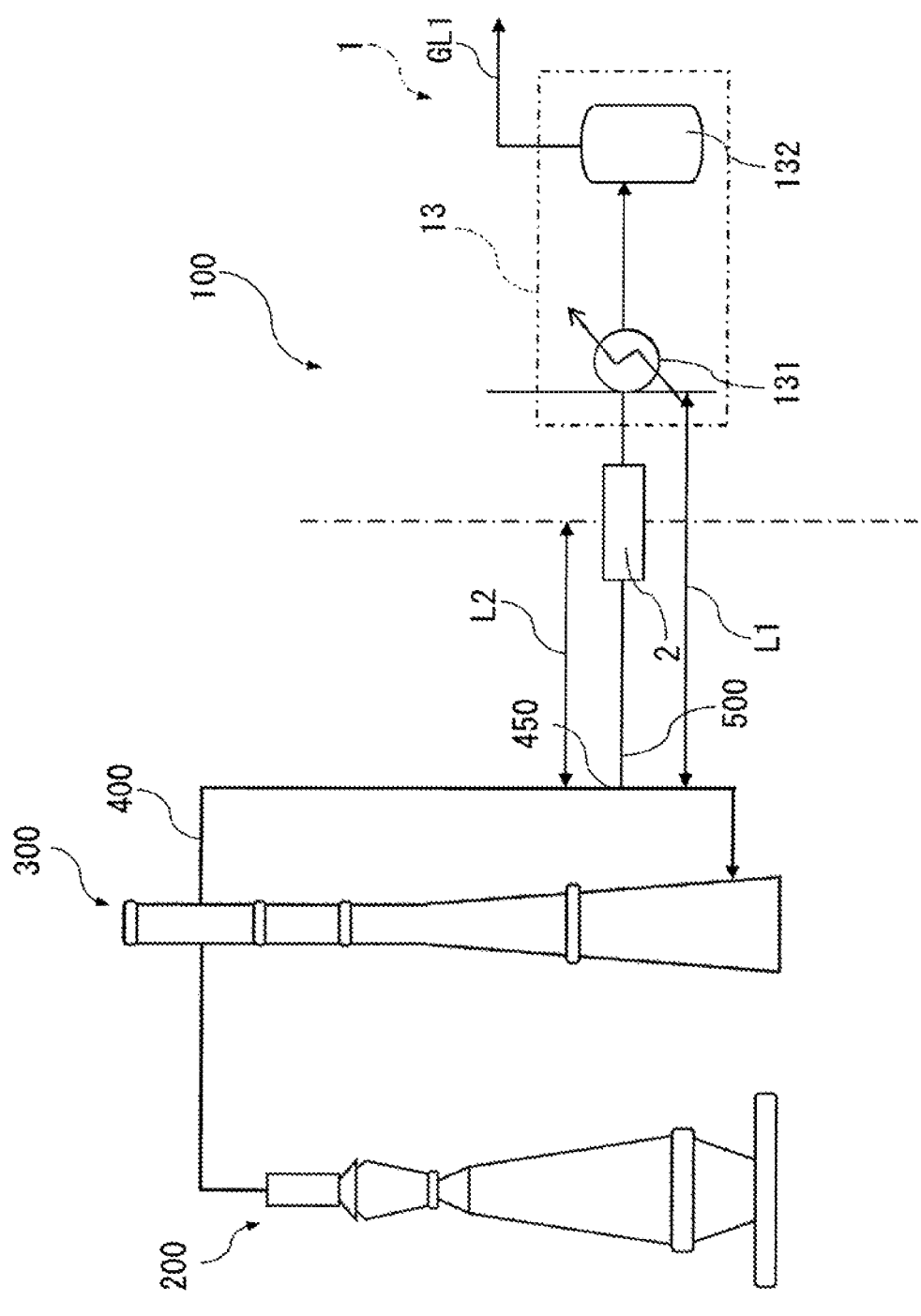
FIG. 5 is a schematic view showing the configuration near the connection section between the gas production apparatus and the exhaust gas equipment.

FIG. 5 is a schematic view showing the configuration near the connection section between the gas production apparatus and the exhaust gas equipment (raw material gas supply section).

In the configuration shown in FIG. 5, a cooling section 13 is provided between the connection section 2 and the flow regulating section 6. The cooling section 13 is equipped with a cooling device 131 and a container 132 connected to the cooling device 131. As described above, the cooling system 131 can consist of a jacketed cooling system, a multitubular cooling system, and the like.

Since the exhaust gas supplied from the exhaust gas equipment contains oxidizing gas components (SOx, HCl, and the like) as well as steam, it is preferable to condense the steam along with the oxidizing gas components by cooling in the cooling section 13 and remove it as condensed water (acidic aqueous solution) in which the oxidizing gas components are dissolved. This process can suitably prevent corrosion of the piping that makes up the gas line GL1.

In the present configuration example, cooling the exhaust gas in the cooling device 131 generates an acidic aqueous solution. This acidic aqueous solution is stored in container 132 and separated from the exhaust gas. A filter may be arranged at the gas-liquid interface in container 132 to allow gas passage but prevent the liquid passage.

In such a configuration, the clearance between branch 450 and the cooling system 131 (L1 in FIG. 5) is not limited, but preferably 10 m or less, and more preferably 1 to 5 m. Setting the clearance L1 within the above range can prevent the formation of condensed water (acidic aqueous solution) with acidic gas dissolved in it at an unintended point in the gas line GL1 and more reliably prevent corrosion of the piping that constitutes the gas line GL1.

Installing the steel production system 100 in a cold district, for example, may generate condensed water on the supply line 500 and may even freeze it, depending on the clearance L2 between branch 450 and the gas production apparatus 1. This situation may cause damage to the piping that makes up the supply line 500.

Therefore, it is preferable to heat the exhaust gas in the supply line 500 to prevent such problems. The heating temperature can be any temperature at which freezing does not occur. Still, it should be above the acid dew point temperature (e.g., 120° C.), and more preferably, 120 to 150° C.

This setting prevents damage to the piping that makes up the supply line 500 while also suitably preventing piping corrosion due to the generation of condensed water in which acid gas is dissolved.

For example, electric heating wires (heaters) can be wound around the piping that makes up the supply line 500 to heat the exhaust gas in the supply line 500. For corrosion-resistant purposes, resin-lined piping, and the like, composed of corrosion-resistant resin material (e.g., fluorine resin material), may be used without a heater.

This configuration example may omit container 132 if necessary.

Using gas production apparatus 1 and the steel production system 100 described above can produce purified gas (product gas) with carbon monoxide as the main component from separated gas including carbon dioxide as the main component to be used in iron manufacturing.
Gas Production Method The gas production method of this embodiment consists of the following steps: I: preparing a plurality of reactors 4a and 4b in which a reducing agent 4R is arranged inside; II: separating and capturing a separated gas having carbon dioxide as the main component from the exhaust gas taken from the gas line 400 of the above-mentioned exhaust gas equipment at the separation and capture unit 5; III: when the separated gas is supplied to the reactors 4a and 4b, and the separated gas is brought in contact with the reducing agent 4R to convert carbon dioxide into carbon monoxide to produce the product gas, the control on the downstream of reactors 4a and 4b regulates the pressure of the separated gas supplied to reactors 4a and 4b. The control on the upstream of the separation and capture section 5 regulates the flow rate of the separated gas supplied to reactors 4a and 4b, and the resulting product gas is then supplied to the blast furnace 200 as it is or as purified gas that has been purified in the gas purification section 9.

In reactors 4a and 4b shown in FIG. 4, when the separated gas is brought into contact with the reducing agent 4R, the reduction reaction of carbon dioxide produces carbon monoxide, and at least some of the oxygen atoms split off from carbon dioxide are captured in the reducing agent 4R. Then, when the reducing gas comes into contact with the reducing agent 4R, oxygen is transferred to hydrogen (the reducing substance), generating water (the oxide of the reducing substance). In other words, in reactors 4a and 4b shown in FIG. 4, at least some oxygen atoms can be separated in the carbon dioxide reduction reaction system (reaction field).

Figure 6:
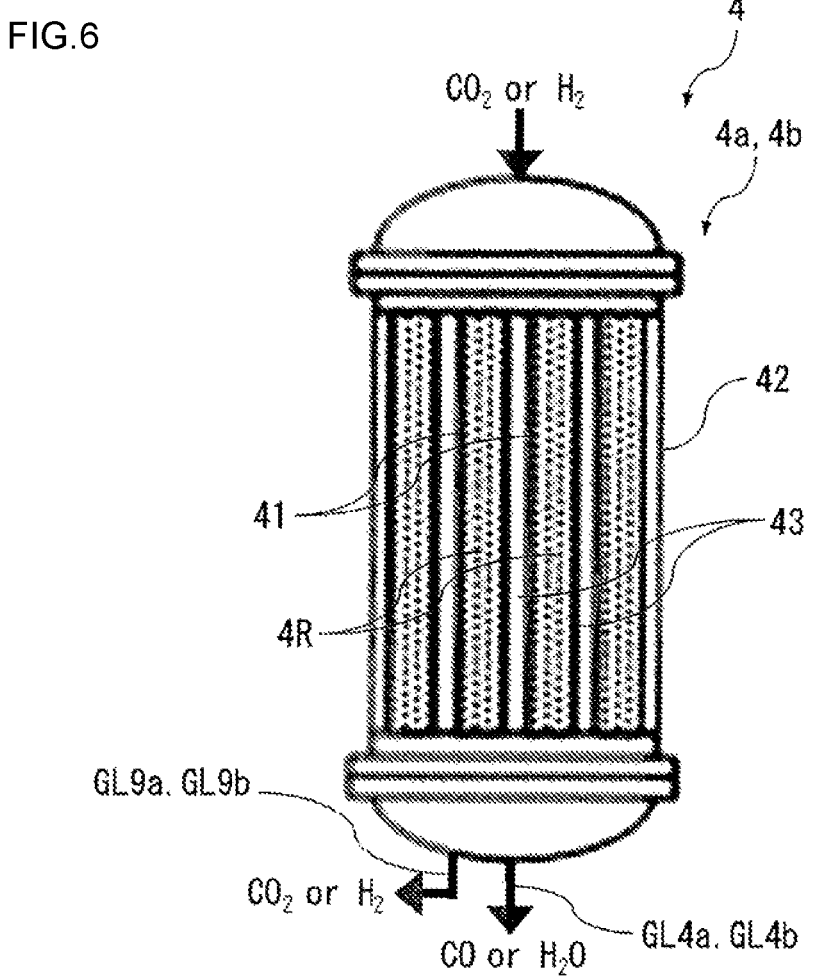
FIG. 6 is a schematic cross-sectional view of the second configuration of the reactor.
Figure 7:
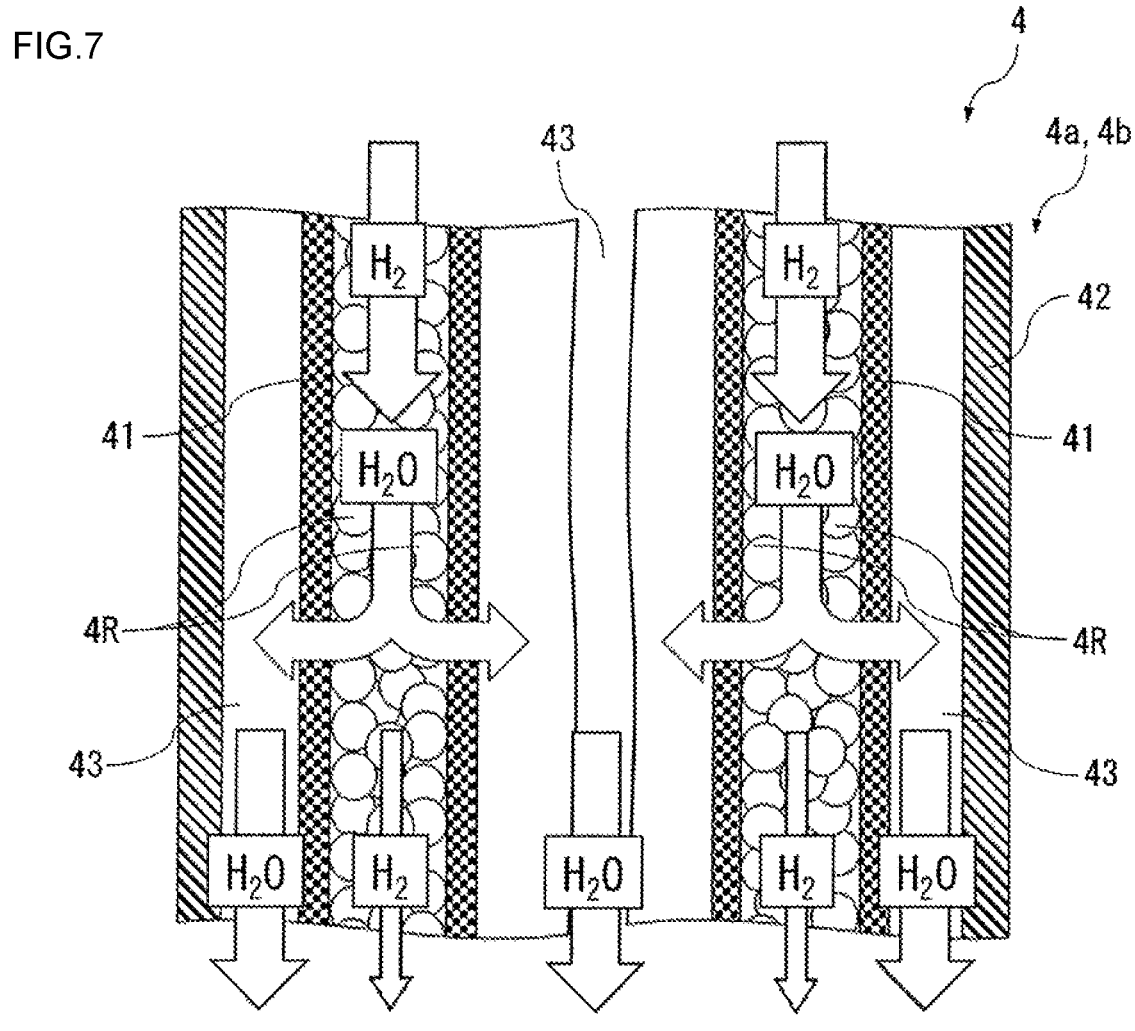
FIG. 7 is an expanded view of a part of FIG. 6.
Figure 8:
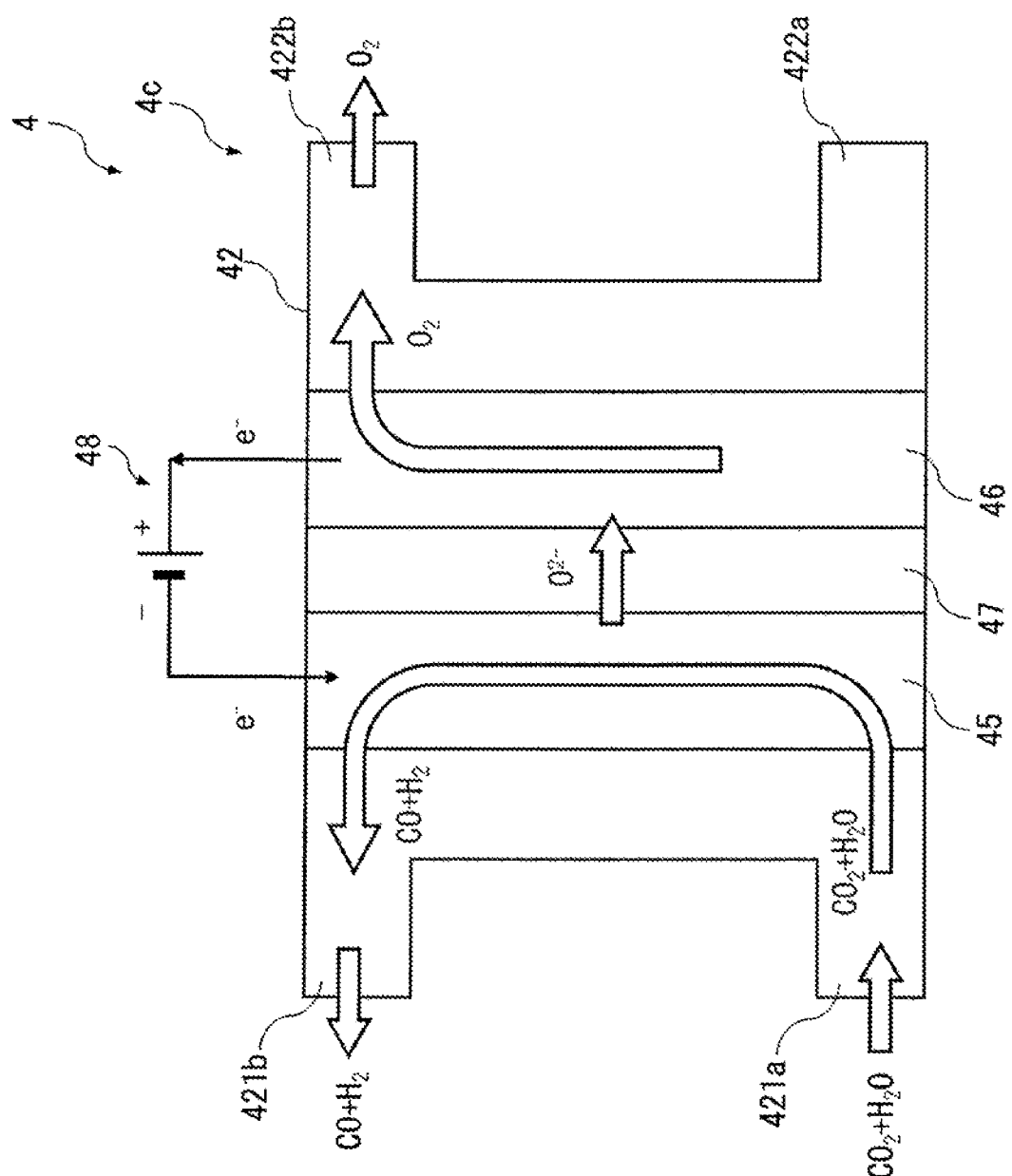
FIG. 8 is a schematic cross-sectional view of the third configuration of the reactor.

A reactor that can separate at least some oxygen atoms in the carbon dioxide reduction reaction system can also adopt the configuration shown in FIGS. 6 to 8.

FIG. 6 is a schematic cross-sectional view of the second configuration example of the reactor. FIG. 7 is an expanded view of a part of FIG. 6. FIG. 8 is a schematic cross-sectional view of the third configuration example of the reactor.

The reactors 4a and 4b of the second configuration example shown in FIGS. 6 and 7 are similar to the reactors 4a, and 4b of the first configuration example shown in FIG. 4, except that tubes 41 can permeate some of the gas components and separate them from other gas components. In reactors 4a and 4b of the second configuration, tube 41 will be referred to as the separation tube 41.

Each of the reactors 4a and 4b shown in FIG. 6 consists of a multitubular reactor (fixed-layer reactor) with a plurality of separating tubes 41, each filled (containing) with a reducing agent (reductant) 4R, and a housing (reactor body) 42 containing the plurality of separating tubes 41.

In the second configuration example, the separation tube 41 is configured to be capable of either separating water (oxide of reducing substance) and hydrogen (reducing substance) produced by contact with the reducing agent 4R or separating carbon monoxide and carbon dioxide produced by contact with the reducing agent 4R, or both.

In particular, separation tube 41 should be preferably configured to allow water (steam) or carbon monoxide to permeate its walls and be separated from hydrogen or carbon dioxide. In this description, water and carbon monoxide produced by the reaction in contact with reducing agent 4R may be described as "substances after contact with reducing agent 4R", and hydrogen and carbon dioxide before contact (reaction) with reducing agent 4R may be described as "substances before contact with reducing agent 4R".

This configuration enables removing the reaction products (substances after contacting the reducing agent 4R) from the lumen of the separation tube 41 (reaction field), i.e., separating the substances before and after contacting the reducing agent 4R, thus maintaining the activity of the reducing agent 4R. As a result, the reactions in Equations 1 and 2 above can continue for a long time, i.e., improving the conversion efficiency of carbon dioxide to carbon monoxide and the reduction (recovery) efficiency of the reducing agent 4R in the oxidized state. As a result, it is possible to efficiently produce product gas containing carbon monoxide from raw material gas containing carbon dioxide.

In this case, the water and carbon monoxide permeating through the separation tube 41 are emitted from reactors 4a and 4b to the branched gas lines GL4a and GL4b. On the other hand, unreacted hydrogen and unreacted carbon dioxide that have passed through separation tube 41 are emitted into the gas lines GL9a and GL9b connected to the housing 42 (space 43).

These gas lines GL9a and GL9b may be connected on the gas lines GL1 and GL2, respectively. This allows for the reuse of unreacted hydrogen and unreacted carbon dioxide.

The gases emitted to branched gas lines GL4a and GL4b may contain other gas components other than water or carbon monoxide, and the gases emitted to gas lines GL9a and GL9b may also contain other gas components other than hydrogen or carbon dioxide.

Cooling the gases emitted from each reactor 4a and 4b can also achieve the separation of carbon monoxide and carbon dioxide and the separation of water and hydrogen, using the difference in the condensation (liquefaction) temperature. However, in this case, using the gas components after separation in a high-temperature state on the downstream of the reactors 4a and 4b (e.g., when they return to the blast furnace 200), the required reheating wastes energy for cooling and reheating. In contrast, in the second configuration example, the temperature of the gas components after separation is unlikely to drop, contributing to the reduction of thermal energy in the entire production procedure of the purified gas, i.e., improving energy efficiency.

As mentioned above, it is preferable to heat the reducing agent 4R to prevent a decrease in the conversion efficiency of carbon dioxide to carbon monoxide. Therefore, separation tube 41 should be heat resistant. This allows sufficiently heating the reducing agent 4R while preventing alteration and deterioration of the separation tube 41.

Such a separation tube 41 is preferably composed of metal, inorganic oxide, or metal-organic frameworks (MOFs). In this case, it is easy to add excellent heat resistance to the separation tube 41. Here, metals include, for example, titanium, aluminum, copper, nickel, chromium, cobalt, or alloys containing these metals. Inorganic oxides include, for example, silica, zeolite, and the like. The metal-organic structures include, for example, the structure of zinc nitrate hydrate and terephthalic acid dianion and the structure of copper nitrate hydrate and trimesic acid trianion. When metal is used, separation tube 41 is preferably composed of a porous material with a porosity of 80% or more.

The separation tube 41 is preferably made of a porous material with continuous pores (pores that penetrate the cylinder wall), which are adjacent pores in communication with each other.

The separation tube 41 of such a configuration can increase the permeability of water or carbon monoxide and perform a more smooth and reliable separation of water from hydrogen and/or carbon monoxide from carbon dioxide.

The porosity of the separation tube 41 is not limited but should be preferably 10-90%, and more preferably 20-60%. This setting allows maintaining the permeability of water or carbon monoxide at a sufficiently high level while preventing the mechanical strength of the separation tube 41 from excessively decreasing.

The shape of the separation tube 41 is not particularly limited. Examples of the shape include cylindrical shapes, polygonal columnar shapes, such as square columns and hexagonal columns, and the like.

Increasing the reduction (recovery) efficiency of the reducing agent 4R in the oxidized state is effective from the viewpoint of more reliably preventing or suppressing the decrease in the conversion efficiency of carbon dioxide to carbon monoxide.

In other words, as shown in FIG. 7, it is preferable to configure the system so that water ($H_2O$) generated by contacting the supplied hydrogen ($H_2$) with the reducing agent 4R in the separation tube 41 is transferred to space 43 in the housing 42 through the separation tube 41.

In this case, the average pore diameter of the separation tube 41 is preferably less than 600 pm and more preferably 400-500 pm. This setting can further improve the separation efficiency between water and hydrogen.

The space 43 inside housing 42 may be depressurized, or a carrier gas (sweep gas) may be allowed to pass through. For example, inert gases such as helium and argon can be used as carrier gases.

The separation tube 41 should be preferably hydrophilic. A hydrophilic separation tube 41 will increase the affinity of water to separation tube 41 and facilitate water permeation through separation tube 41.

Methods of imparting hydrophilicity to the separation tube 41 include improving the polarity of the separation tube 41 by changing the ratio of metal elements in the inorganic oxide (for example, increasing the Al/Si ratio), coating the separation tube 41 with a hydrophilic polymer, treating the separation tube 41 with a coupling agent having hydrophilic groups (polar groups), and performing plasma treatment, corona discharge treatment, and the like, on the separation tube 41.

Furthermore, the surface potential of the separation tube 41 may be regulated to control its affinity for water.

On the other hand, if the separation of carbon monoxide and carbon dioxide is prioritized in the separation tube 41, or if both the separation of water and hydrogen and the separation of carbon monoxide and carbon dioxide are to be performed simultaneously, the component materials, the porosity, the average pore diameter, the degree of hydrophilicity or hydrophobicity, the surface potential, and the like, of the separation tubes 41 may be appropriately set in combination.

The reactors 4a and 4b shown in FIGS. 3, 4, 6, and 7 were configured to divide the reverse water gas shift reaction into two parts: the conversion reaction of carbon dioxide to carbon monoxide and the reduction reaction by hydrogen (reducing substance), and to use the method of bridging these reactions to the reducing agent 4R (the so-called chemical looping method).

The reactor in this invention can also be configured to convert carbon dioxide into carbon monoxide by electrolysis. The following is an explanation of such a configuration (third configuration example).

The reactor 4c in the third configuration shown in FIG. 8 is a reactor that performs the carbon dioxide reduction reaction electrochemically and is also called a reaction cell, electrolytic cell, or electrochemical cell.

The reactor 4c has a housing 42, a cathode 45, anode 46, and solid electrolyte layer 47 in the housing 42, and a power supply 48 electrically connected to the cathode 45 and anode 46.

In such a configuration, the space inside housing 42 is divided into left and right sections by a laminate of the cathode (reductant) 45, anode 46, and solid electrolyte layer 47.

The housing 42 has a cathode side inlet port 421a, a cathode side outlet port 421b, an anode side inlet port 422a, and an anode side outlet port 422b. The cathode side inlet port 421a and the cathode side outlet port 421b are communicated with the cathode chamber in the left side space in housing 42. The anode side inlet port 422a and the anode side outlet port 422b are communicated with the anode chamber in the right side space in housing 42.

The cathode 45 and anode 46 each consist of an electrically conductive carrier and a catalyst carried by the carrier.

The carrier can be composed of carbon materials such as carbon fiber fabric (carbon cloth, carbon felt, and the like) and carbon paper.

The catalysts include platinum group metals such as platinum, ruthenium, rhodium, palladium, osmium, and iridium, transition metals such as gold, alloys of these metals, and alloys of these metals with other metals.

The solid electrolyte layer 47 can be composed of, for example, a fluorinated polymer film with sulfonic acid groups (such as Nafion (registered trademark)), a sulfobased ion exchange resin membrane, and the like.

For the power supply 48, it is preferable to use a power supply that generates electric power as renewable energy. This arrangement will further improve the energy efficiency in the production of the product gas.

In such a reactor 4c, when separated gas (carbon dioxide and steam) is supplied from the cathode side inlet port 421a, electrons supplied from the power supply 48 and the action of the catalyst produce carbon monoxide and hydrogen through the reduction reaction of carbon dioxide and water, as well as oxygen ions. Carbon monoxide and hydrogen are emitted from the cathode side outlet port 421b into the gas line (gas line GL4), and oxygen ions diffuse in the solid electrolyte layer 47 toward the anode 46. The oxygen ions that reach the anode 46 are converted to oxygen by being stripped of electrons and are emitted from the anode-side outlet port 422b.

In this way, at least some oxygen atoms leaving carbon dioxide at the cathode 45 are separated in the reduction reaction system (reaction field) as oxygen ions and converted to oxygen at anode 46.

The reactor in the present invention may be a reactor that is configured so as not to separate at least some of the oxygen atoms that leave carbon dioxide due to the reduction reaction in the reduction reaction system.

Such a reactor is a device that uses a reverse water gas shift reaction, in which carbon dioxide and hydrogen are simultaneously brought into contact with the reducing agent 4R, converting carbon dioxide to carbon monoxide and hydrogen (the reducing substance) to water (the oxide of the reducing substance).

In this reactor, at least some oxygen atoms split off from carbon dioxide are not separated from the reduction reaction system (reaction field) but react with hydrogen to produce water.

However, the reaction products, carbon monoxide, and water will not coexist in the system in a reactor that can separate at least some oxygen atoms leaving carbon dioxide in the reduction reaction system (reaction field), preventing or suppressing the decrease in the conversion efficiency of carbon dioxide to carbon monoxide due to the constraints of chemical equilibrium.

In the steel production system 100 (gas production apparatus 1) described above, the gases passing through reactors 4a and 4b were configured to merge immediately after passing through the reactors 4a and 4b. However, various treatments may be applied to the gases before they merge. In other words, at least one type of treater can be installed on the branch gas lines GL4a and GL4b for any purpose.

The gas joint section J4 may be omitted, and the branch gas lines GL4a and GL4b may be used as independent gas lines. In this case, the gas (water or carbon monoxide) passing through each reactor 4a and 4b is transferred through branched gas lines GL4a and GL4b, independent of each other. For example, the gas containing water (steam) is provided for disposal or conversion treatment to tank 30, and the gas containing carbon monoxide is provided for the purification process, if necessary, before being provided for later processing. Such a configuration allows treatment of the gases after passing through the respective reactors 4a and 4b independently from each other.

The chemical manufacturing system has the above-mentioned gas production apparatus 1 and a second reaction facility connected on the downstream of the gas production apparatus 1 (reaction section 4), and purified gas (product gas) is supplied to the second reaction facility, and chemicals are produced using carbon monoxide contained in the purified gas.

The second reaction facility includes, for example, a reaction tank for synthesizing chemicals (e.g., ethanol, and the like) through fermentation by microorganisms (e.g., *clostridium*, and the like), and a reaction vessel for producing chemicals (e.g., phosgene, acetic acid, and the like) using carbon monoxide as a synthetic raw material.

In this case, the product gas containing carbon monoxide at a relatively low concentration (75-90% by volume) or the purified gas (product gas) at a relatively low temperature is available. Therefore, if necessary, at least one of the gas purification section 9 and the purified gas heating section 15 can be omitted.

The gas production apparatus, gas production system, steel production system, chemical manufacturing system, and gas production method of the present invention have been described above. However, the present invention is not limited to the description.

For example, the gas production apparatus, gas production system, steel production system, and chemical manufacturing system may each have any other additional configuration to the above embodiments, may be replaced with any configuration exhibiting similar functions, and some configurations may be omitted.

The gas production method of the present invention may have some procedure for any purpose additional to the above embodiment.

The reactors 4a and 4b may be configured with a moving layer reactor instead of a fixed layer reactor. In this case, the two reactors 4a and 4b can be connected to each other at the top and bottom, and the reducing agent 4R can be transferred (circulated) between the reactors 4a and 4b.

In this case, the gas line GL1 should be connected to the inlet port of one of the reactors 4a and 4b without branching, and the gas line GL2 should also be connected to the inlet port of the other of the reactors 4a and 4b without branching.

In this case, one of the reactors 4a and 4b is composed of a vertical countercurrent reactor, and the other is composed of a vertical cocurrent reactor. Furthermore, both reactors 4a and 4b may be configured as crosscurrent reactors.

In the above embodiment, a gas containing hydrogen is described as representative of the reducing gas. However, a gas containing at least one kind selected from hydrocarbons (e.g., methane, ethane, acetylene, and the like) and ammonia can also be used as the reducing substance, instead of or together with hydrogen.

In the above embodiment, in a configuration with reactors 4a and 4b, the pressure regulating section 7 is described as a case where it is provided on the downstream of the gas joint section J4, but it may be provided for each reactor 4a and 4b.

The exhaust gas to be taken out of the exhaust gas equipment can be on the gas line 400 or even on the upstream of the treater 410.

REFERENCE SIGNS LIST

100 Steel Production System (gas production system)
200 Blast Furnace
300 Smokestack
400 Gas line
410 Treater, 450 Branch
500 Supply line
600 Return line
1 Gas production apparatus
2 Connection Section
3 Reducing Gas Supply Section
4 Reaction Section
4a, 4b Reactor
41 Tube or Separation Tube, 42 Housing, 43 Space, 44 Partition Wall
4R Reducing Agent
4c Reactor
421a Cathode Side Inlet Port, 421b Cathode Side Outlet Port,
422a Anode Side Inlet Port, 422b Anode Side Outlet Port
45 Cathode, 46 Anode, 47 Solid Electrolyte Layer, 48 Power Supply
5 Separation and Capture Section
6 Flow Regulating Section
7 Pressure Regulating Section
PI Pressure Gauge
8 Gas Switching Section
9 Gas Purification Section
15 Purified Gas Heating Section
30 Tank
40 Purified Gas Emission Section
GL1 Gas Line
GL2 Gas Line
GL3a, GL3b Gas Lines
GL4 Gas Line
GL4a, GL4b Branch Gas Line, J4 Gas Joint Section
L1 Separation Distance
L2 Separation Distance

The invention claimed is:

1. A gas production apparatus, comprising:
   a separation and capture section configured to separate and capture a separated gas including carbon dioxide as a main component from an exhaust gas of exhaust gas equipment;
   a reaction section including reactors which are downstream of the separation and capture section, each of the reactors: (i) containing a reductant configured to contact the separated gas to produce carbon monoxide through a reduction reaction of carbon dioxide; (ii)

being configured to separate at least some oxygen atoms split off from carbon dioxide in the reduction reaction; and (iii) having a reducing agent containing a metal oxide configured to reduce carbon dioxide as the reductant;

a reducing gas supply section configured to supply a reducing gas containing a reducing substance configured to reduce the reducing agent oxidized by contact with carbon dioxide;

a pressure regulating section which is downstream of the reactors and configured to regulate a pressure of the separated gas supplied to each of the reactors; and a flow regulating section which is upstream of the separation and capture section and configured to regulate a flow rate of the separated gas supplied to each of the reactors, wherein:

the separation and capture section and the flow regulating section are arranged on only a single line connected to the reaction section;

each of the reactors is connected to at least one of the separation and capture section or the reducing gas supply section; and each of the reactors is configured to: (i) switch between the separated gas and the reducing gas to be supplied to each of the reactors; or (ii) transfer the reducing agent between the reactors.

2. The gas production apparatus according to claim 1, wherein the separation and capture section is configured to regulate a concentration of the carbon dioxide in the separated gas to be 70% or more by volume of a total of the separated gas.

3. The gas production apparatus according to claim 1, wherein the pressure regulating section is configured to regulate the pressure of the separated gas supplied to each of the reactors to be 0 MPaG to 2 MPaG.

4. The gas production apparatus according to claim 1, wherein each of the reactors is connected to the separation and capture section and the reducing gas supply section.

5. A gas production system, comprising:

the gas production apparatus according to claim 1; and the exhaust gas equipment, wherein:

the exhaust gas equipment includes a furnace, a smokestack configured to release the exhaust gas which contains the carbon dioxide and is emitted from the furnace, and the single line connecting the smokestack to the furnace; and the separation and capture section is connected to the single line and configured to extract the exhaust gas from the exhaust gas equipment.

6. The gas production system according to claim 5, wherein:

the exhaust gas equipment further comprises a treater arranged on the single line and configured to treat the exhaust gas; and the gas production apparatus is configured to take the exhaust gas from the single line between the smokestack and the treater.

7. The gas production system according to claim 6, wherein the treater includes at least one of a fan, a combustion furnace, a denitrator, or a desulfurizer.

8. The gas production system according to claim 6, wherein the treater includes a fan, a combustion furnace, a denitrator, and a desulfurizer.

9. A steel production system, comprising:

the gas production apparatus according to claim 1; and a melting furnace which is downstream of the reactors, wherein:

each of the reactors is configured to bring the separated gas into contact with the reductant to convert carbon dioxide into carbon monoxide as a product gas; and the steel production system is configured to supply the product gas containing carbon monoxide to the melting furnace to produce steel.

10. The steel production system according to claim 9, wherein a concentration of the carbon monoxide in the product gas is 70% or more by volume of a total of the product gas.

11. The steel production system according to claim 9, further comprising a product gas heater configured to heat the product gas before the product gas is supplied to the melting furnace.

12. The steel production system according to claim 11, wherein a temperature of the product gas after heating by the product gas heater is between 500° C. and 1300° C.

13. A chemical manufacturing system, comprising:

the gas production apparatus according to claim 1; and a reaction facility which is downstream of the reactors, wherein:

each of the reactors is configured to bring the separated gas into contact with the reductant to convert carbon dioxide into carbon monoxide as a product gas; and the chemical manufacturing system is configured to supply the product gas containing carbon monoxide to the reaction facility to produce chemicals.

* * * * *